United States Patent
Liardet et al.

(10) Patent No.: US 7,593,258 B2
(45) Date of Patent: Sep. 22, 2009

(54) PROTECTION OF THE FLOW OF A PROGRAM EXECUTED BY AN INTEGRATED CIRCUIT OR OF DATA CONTAINED IN THIS CIRCUIT

(75) Inventors: Pierre-Yvan Liardet, Peynier (FR); Yannick Teglia, Marseilles (FR); Alain Pomet, Rousset (FR)

(73) Assignee: STMicroelectronics S.A., Montrouge (FR)

(*) Notice: Subject to any disclaimer, the term of this patent is extended or adjusted under 35 U.S.C. 154(b) by 17 days.

(21) Appl. No.: 11/641,550

(22) Filed: Dec. 19, 2006
(Under 37 CFR 1.47)

(65) Prior Publication Data
US 2007/0159882 A1 Jul. 12, 2007

Related U.S. Application Data

(63) Continuation of application No. 11/406,839, filed on Apr. 18, 2006, now abandoned.

(30) Foreign Application Priority Data
Apr. 21, 2005 (FR) .................................. 05 51011

(51) Int. Cl.
*G11C 11/34* (2006.01)
(52) U.S. Cl. ............................. 365/185.02; 365/185.24
(58) Field of Classification Search ............ 365/185.02, 365/185.24
See application file for complete search history.

(56) References Cited

U.S. PATENT DOCUMENTS

| | | | |
|---|---|---|---|
| 6,778,066 B2* | 8/2004 | Smith | 340/5.61 |
| 7,372,304 B2* | 5/2008 | Fruhauf et al. | 326/93 |
| 2005/0021966 A1* | 1/2005 | Chow et al. | 713/176 |
| 2006/0265570 A1* | 11/2006 | Bancel et al. | 712/34 |
| 2007/0055868 A1* | 3/2007 | Brier et al. | 713/162 |
| 2007/0086586 A1* | 4/2007 | Jakubowski et al. | 380/28 |

FOREIGN PATENT DOCUMENTS

WO    WO 2004/007049 A2    8/2004

OTHER PUBLICATIONS

French Search Report from corresponding French Application No. 05/51011, filed Apr. 21, 2005.

* cited by examiner

*Primary Examiner*—Michael T Tran
(74) *Attorney, Agent, or Firm*—Lisa K. Jorgenson; James H. Morris; Wolf, Greenfield & Sacks, P.C.

(57) ABSTRACT

A method for protecting an integrated circuit, including at least one non-volatile memory, including the steps of detecting a possible disturbance in the flow of a program executed by the integrated circuit, modifying the value of a digital variable in a volatile storage element in case of a disturbance detection and, in a way independent in time from the detection, intervening upon the non-volatile memory according to the value of said variable.

25 Claims, 2 Drawing Sheets

PROTECTION OF THE FLOW OF A PROGRAM EXECUTED BY AN INTEGRATED CIRCUIT OR OF DATA CONTAINED IN THIS CIRCUIT

CROSS REFERENCE TO RELATED APPLICATIONS

This application is a continuation of U.S. application Ser. No. 11/406,839, filed Apr. 18, 2006 now abandoned entitled PROTECTION OF THE FLOW OF A PROGRAM EXECUTED BY AN INTEGRATED CIRCUIT OR OF DATA CONTAINED IN THIS CIRCUIT, which application is incorporated herein by reference in its entirety.

BACKGROUND OF THE INVENTION

1. Field of the Invention

The present invention generally relates to electronic circuits and, more specifically, to the protection of a program executed by an integrated circuit or of digital data contained in an integrated circuit against an extraction thereof, after a disturbance of the circuit operation. The present invention, for example, relates to a protection against an extraction of data after fault injections into the circuit operation and more specifically into a program using the digital quantity or quantities to be protected. According to another example, the present invention relates to a protection against a disturbance in the flow of a program after a fault injection.

The present invention for example applies to smart cards.

2. Discussion of the Related Art

FIG. 1 is a block diagram of a simplified architecture of an integrated circuit 1, for example, of a smart card, of the type to which the present invention applies. Circuit 1 comprises a central processing unit 11 (CPU) associated with several memories 12 (MEM) among which at least a RAM-type read/write memory and a rewritable non-volatile memory, for example, of EEPROM type, and an input/output circuit 13 (I/O) enabling data exchange with the outside of circuit 1. The different elements communicate via one or several internal data, address, and control buses 14.

A category of attacks likely to be performed by persons attempting to fraudulently obtain confidential data from chip 1 relates to so-called fault-injection attacks. Such attacks comprise disturbing the operation of component 1, for example, by means of radiation (laser, infrared, X-rays, etc.) or by other means (for example, by acting on the component power supply). In the case of a data hacking, such attacks are generally iterative to successively discover the different bits of a secret quantity. Fault injections generally cause a trap in the program flow. Such a trap may also be searched by a hacker, independently from a data output for, for example, skipping a protection, identification, etc. mechanism.

Such attacks may be combined with a simple power analysis (SPA), which comprises measuring the integrated circuit power consumption during the execution of algorithms handling secret keys or quantities that the person attempting fraud tries to find, this power consumption being different according to the respective states of the bits of the handled quantities. Simple power analysis attacks are based on the exploitation of results provided by the circuit based on assumptions made on the different bits of the quantity to be discovered.

Some integrated circuits comprise software and/or hardware tools for detecting disturbances in their operation by checking that a program has properly executed. For example, the same instructions are executed twice and it is checked that they lead to the same result, or a signature calculation is performed on data extracted from the memory. According to another example, the circuit comprises light temperature detectors, etc. for detecting a possible disturbance.

FIG. 2 partially and very schematically shows a conventional example of the mechanism of an integrated circuit 1 for protecting confidential data that it contains. Circuit 1 comprises one or several hardware detectors 21 (H DETECT) of voltage, temperature, light, etc. sensor type and/or one or several software detectors 22 (S DETECT) of signature calculation, corrector code calculation, etc. type. The results of detector(s) 21 and 22 are interpreted by a circuit of a program for tracking the circuit operation (block 23, TRACK). In case of a detected disturbance, mechanism 23 causes either the writing (WR) of a control word (EEFLAG) into non-volatile memory 121 (EEPROM), or the clearing (CLR) of this memory, at least as concerns the portion containing secret data or algorithms of circuit 1.

FIG. 3 illustrates the operation of the detection mechanism shown in FIG. 2. In the execution (EXEC) of a program 31 (PROGRAM) by the central processing unit (11, FIG. 1) of the integrated circuit, it is assumed that a person attempting fraud disturbs the circuit operation by a fault injection (FAULT). This disturbance is detected (block 20, DETECT) by the mechanism for tracking (TRACK) the circuit operation. This detection results in the processing of an alarm (block 23', ALARM) which causes writing or clearing (block 25, WR/CLR) in the non-volatile memory.

A disadvantage of this type of mechanism is that the current signature of a programming in an EEPROM-type non-volatile memory is very characteristic and easy to detect by monitoring the power consumption of integrated circuit 1. Accordingly, a person attempting fraud who performs, in parallel, an analysis (ANALYSIS) of the circuit power consumption is able to detect, after his fault injection, the circuit reaction by an attempt to write into the non-volatile memory. The person attempting fraud can then cause an immediate stopping of the circuit supply (block 35, I DET/PW STOP) and thus prevent the execution of the counter-measurement (block 25). Power supply cutting may take different forms (for example, abrupt removal of the card from a reader in case of a smart card with contacts or suppression of the remote-supply carrier in case of a contactless card).

From the moment that the hacker is able to suppress the integrated circuit power supply to prevent the writing into the non-volatile memory or the clearing thereof, he can perform a new iteration of its fault-injection attack and, for example, end up obtaining the digital quantity (or quantities) supposed to remain secret.

SUMMARY OF THE INVENTION

The present invention aims at overcoming all or part of the disadvantages of known mechanisms for protecting an integrated circuit after a fault injection detection.

The present invention more specifically aims at avoiding for a person attempting fraud to be able to prevent the execution of a write mechanism in a non-volatile memory after a fraud attempt detection.

The present invention also aims at providing a solution compatible with hardware elements of conventional integrated circuits.

The present invention also aims at providing a solution which applies whatever the aim of the fault injection (data output or simple program trap).

To achieve all or part of these objects, the present invention provides a method for protecting an integrated circuit comprising at least one non-volatile memory, comprising the steps of:

detecting a possible disturbance in the flow of a program executed by the integrated circuit;

modifying the value of a digital variable in a volatile storage element in case of a disturbance detection; and in a way independent in time from the detection, intervening the non-volatile memory according to the value of said variable.

According to an embodiment of the present invention, the intervention in the non-volatile memory comprises the copying of information representative of the value of the variable of the volatile storage element in an area of the non-volatile memory.

According to an embodiment of the present invention, the method is used to protect the flow of a program executed by the integrated circuit.

According to an embodiment of the present invention, the content of said information in the non-volatile memory is tested to decide of the clearing of at least a portion of this non-volatile memory.

According to an embodiment of the present invention, the method is used to protect a digital quantity contained in said non-volatile memory.

According to an embodiment of the present invention, the content of said information in the non-volatile memory conditions the data output of the integrated circuit.

According to an embodiment of the present invention, the intervention on the non-volatile memory is an at least partial clearing of this memory.

According to an embodiment of the present invention, the intervention on the non-volatile memory is performed periodically.

According to an embodiment of the present invention, said volatile storage element is a register of a central processing unit of the integrated circuit.

According to an embodiment of the present invention, said volatile storage element is an area of a volatile memory of the integrated circuit.

The present invention also provides an integrated circuit comprising at least a central processing unit, a first non-volatile memory, and a second volatile memory, at least one detector of an attempt to disturb the circuit operation, and such a protection mechanism.

The present invention also provides a smart card comprising such an integrated circuit.

The foregoing and other objects, features, and advantages of the present invention will be discussed in detail in the following non-limiting description of specific embodiments in connection with the accompanying drawings.

DETAILED DESCRIPTION

Figure 1:
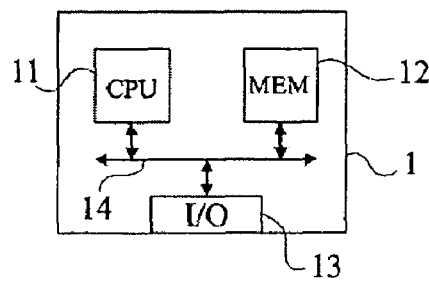
FIG. 1, previously described, partially and very schematically shows in the form of blocks an example of the architecture of an integrated circuit of the type to which the present invention applies.
Figure 2:
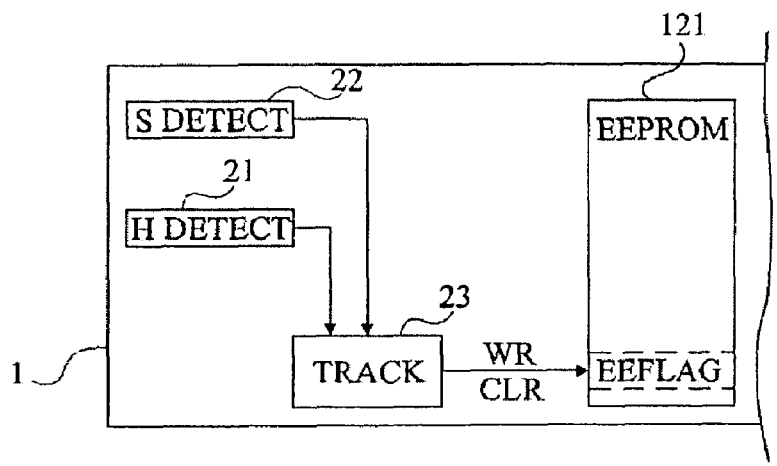
FIG. 2 very schematically shows in the form of blocks a conventional mechanism of protection of an integrated circuit after the detection of a fault injection.
Figure 3:
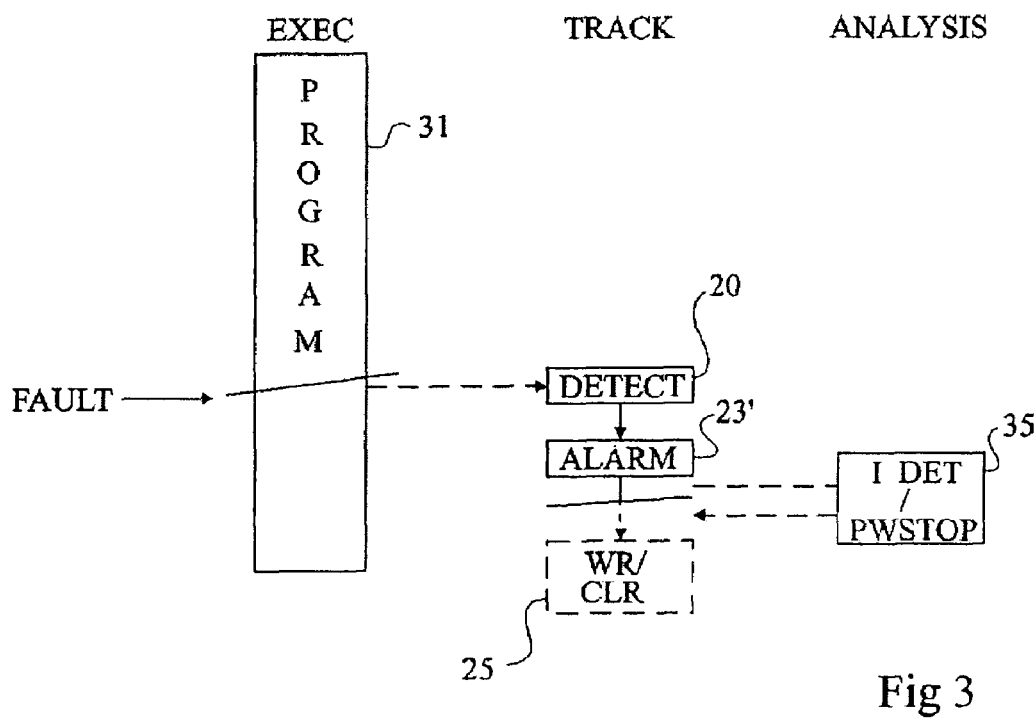
FIG. 3 illustrates the operation of the mechanism of FIG. 2.

The same elements have been designated with the same reference numerals in the different drawings. For clarity, only those elements and method steps which are useful to the understanding of the present invention have been shown in the drawings and will be described hereafter. In particular, the software or hardware structure of the disturbance detectors in an integrated circuit has not been described in detail, the present invention being compatible with any conventional detector. Similarly, the programs executed by an integrated circuit of the type to which the present invention applies and the handled data have not been discussed, the present invention being here again compatible with any conventional program.

A feature of an embodiment of the present invention is, in case a fault injection (be it voluntary or incidental) is detected, to update a variable in a volatile storage element of the integrated circuit, then process this information for copying into a non-volatile memory or clearing of at least the confidential data that it contains, in a way decorrelated from the detection.

Figure 4:
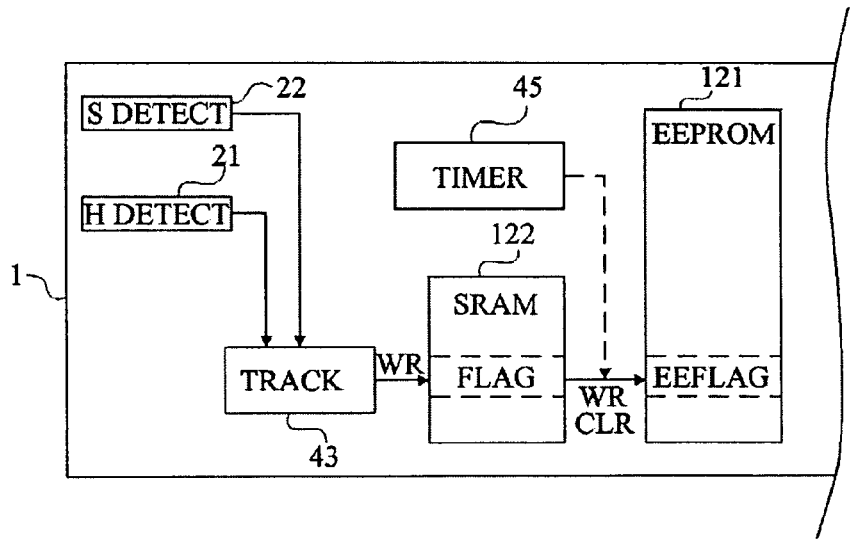
FIG. 4 very schematically shows in the form of blocks an embodiment of a mechanism for protecting an integrated circuit according to the present invention.

FIG. 4 partially and very schematically shows in the form of blocks an embodiment of an integrated circuit 1 provided with a protection mechanism according to the present invention.

As previously, circuit 1 comprises one or several hardware detectors 21 (H DETECT) of possible disturbances on the integrated circuit operation or the execution of a program, and/or one or several software detectors 22 (S DETECT). The results of such detectors are exploited by a hardware and/or software mechanism 43 (TRACK).

According to this embodiment of the present invention, in case of the detection of a fault resulting, for example, from a fraud attempt, mechanism 43 causes the writing (WR) of a variable (FLAG) into a volatile memory area 122 (SRAM) of integrated circuit 1. The recording of such a variable is not detectable from the circuit power consumption since it cannot be made out from normal and frequent accesses of the program to this non-volatile memory. As an alternative, variable FLAG is stored in a register of the central processing unit.

The content of variable FLAG in the volatile memory is regularly exploited, preferably periodically by means of a time counter (block 45, TIMER) of the central processing unit, for an intervention on a non-volatile rewritable memory 121 (EEPROM).

According to a first embodiment of the present invention, a word EEFLAG is written (WR) into an area (address) of non-volatile memory 121. For example, it is a copying of the content of variable FLAG of memory 122.

According to another embodiment, if variable FLAG of the volatile memory indicates the detection of a fraud attempt, at least the area of rewritable non-volatile memory 121 containing confidential data is cleared (CLR).

Figure 5:
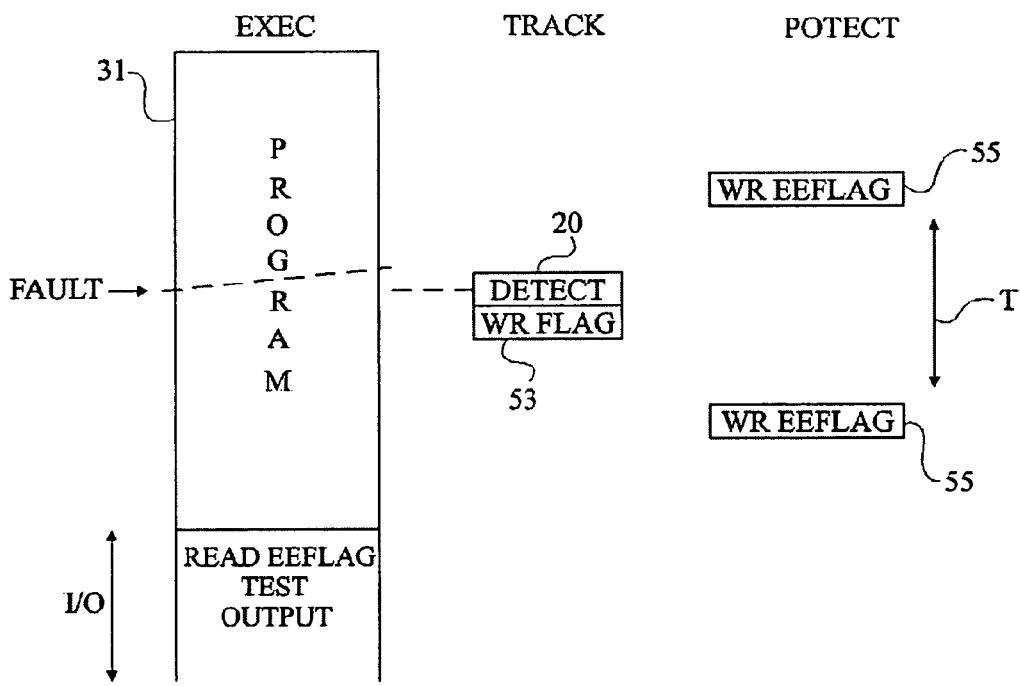
FIG. 5 illustrates the operation of the mechanism of FIG. 4.

FIG. 5 very schematically illustrates an operation mode of the mechanism described in relation with FIG. 4.

An execution (EXEC) of a program 31 (PROGRAM) and the injection of a fault (FAULT) in the flow thereof are assumed.

As previously, this fault is detected (block 20, DETECT) by the mechanism (TRACK) for tracking the operation of circuit 1.

After this detection, the mechanism of the present invention positions variable FLAG (block 53, WR FLAG) in the volatile memory.

In parallel and independently, the protection mechanism of the present invention (PROTECT) periodically writes (blocks 55, WR EEFLAG) the content (more generally, information representative of this content) of variable FLAG of the volatile memory into the non-volatile memory. The periodicity (T) between two write operations in the non-volatile memory is set, preferably, by a counter of the central processing unit (not shown in FIG. 5).

In the example illustrated in FIG. 5, the management of the data inputs/outputs (I/O) depends on a reading (READ EEFLAG) from the area containing information EEFLAG in the non-volatile memory, followed by a testing (TEST) of the value of this information before deciding of the data output (OUTPUT) to the outside of the circuit. Preferably, period T between two writings of information EEFLAG is then selected to be shorter than the duration of execution of the program between a critical area likely to undergo a fault injection and the call to the input/output procedure, to be able to avoid the data output.

According to another embodiment, the reading of word EEFLAG from the non-volatile memory is performed before any operation considered as critical as concerns the security of the execution of a program or of confidential data contained in the integrated circuit and, preferably, after each starting of a new program session. If the value corresponds to an identified attack, the central processing unit for example causes the clearing of the critical data from the non-volatile memory, or prevents the program starting.

Preferably, the content of variable FLAG is selected to have a balanced current signature between the states indicative of a fault detection and indicative of a normal operation (identical Hamming weight of the two values).

Preferably, to preserve the lifetime of the EEPROM-type non-volatile memory, the address of indicative word EEFLAG is not always the same.

An advantage of the present invention is that it makes the fact that a differential fault analysis attack has been detected by the circuit undetectable by a possible hacker.

Another advantage of the present invention is that it preserves the non-volatile processing of this fraud detection.

Another advantage of the present invention is that it is compatible with the different modes of exploitation of fraud attempt detections, be it a forbidding to output data from a smart card or a clearing of a memory area thereof.

Another advantage of the present invention is that it does not modify the actual detection of a fraud attempt and is compatible with conventional disturbance detectors.

Of course, the present invention is likely to have various alterations, improvements, and modifications which will readily occur to those skilled in the art. In particular, the practical implementation of the present invention by software and/or hardware means is within the abilities of those skilled in the art based on the functional indications given hereabove. Further, although the present invention has been described in relation with a preferred application to smart cards, it more generally applies to the protection of any integrated circuit.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for protecting an integrated circuit comprising at least one non-volatile memory, comprising steps of:
   detecting a possible disturbance in a flow of a program executed by the integrated circuit;
   modifying a value of a digital variable in a volatile storage element when a disturbance is detected;
   in a way independent from the detection of the disturbance, periodically checking the value of the digital variable; and
   when the value of the digital variable indicates that the disturbance has been detected, modifying at least a portion of the at least one non-volatile memory according to the value of said digital variable.

2. The method of claim 1, wherein modifying the at least a portion of the at least one non-volatile memory comprises copying of information representative of the value of the digital variable of the volatile storage element in an area of the at least one non-volatile memory.

3. The method of claim 1, wherein the flow of the program executed by the integrated circuit is protected.

4. A method for protecting an integrated circuit comprising at least one non-volatile memory, the method comprising steps of:
   detecting a possible disturbance in a flow of a program executed by the integrated circuit;
   modifying a value of a digital variable in a volatile storage element when a disturbance is detected;
   in a way independent from the detection of the disturbance, periodically checking the value of the digital variable;
   copying information representative of the value of the digital variable to the at least one non-volatile memory; and
   testing the value of said digital variable in the at least one non-volatile memory to determine whether to erase at least a portion of the at least one non-volatile memory,
   wherein the flow of the program executed by the integrated circuit is protected.

5. The method of claim 1, for protecting a digital quantity contained in said at least one non-volatile memory.

6. The method of claim 5, wherein contents of said information copied to the at least one non-volatile memory condition a data output of the integrated circuit.

7. The method of claim 1, wherein modifying the at least a portion of the at least one non-volatile memory comprises erasing at least one portion of the at least one non-volatile memory.

8. The method of claim 1, wherein the modification of the at least one non-volatile memory is performed periodically.

9. The method of claim 1, wherein said volatile storage element is a register of a central processing unit of the integrated circuit.

10. The method of claim 1, wherein said volatile storage element is an area of a volatile memory of the integrated circuit.

11. An integrated circuit comprising at least a central processing unit, a first non-volatile memory, and a second volatile memory, at least one detector of an attempt to disturb the circuit operation, and comprising a protection mechanism for implementing the method of claim 1.

12. A smart card, comprising the integrated circuit of claim 11.

13. A device, comprising:
   a flag configured to indicate an occurrence of a disturbance in an execution of a program running on the device;
   a timer configured to control a periodical copying of a value of the flag to a bit word; and
   a non-volatile storage element comprising the bit word, the non-volatile storage element configured to remove at least a portion of data stored in the non-volatile storage element if the value of the flag indicates the occurrence of the disturbance.

14. The device of claim 13, wherein a detector detects the disturbance.

15. The device of claim 14, wherein the value of the flag is set by the detector.

16. The device of claim 13, wherein the timer is a counter of a central processing unit of the device.

17. The device of claim 13, wherein the flag is stored in a volatile storage element or a register of a central processing unit.

18. The device of claim 13, wherein the portion of data removed is confidential data.

19. A method, comprising:

setting a value of a digital variable according to an indication of a disturbance in an execution of a program;

periodically reading the value of a digital variable; and intervening upon the non-volatile storage element according to the value of the digital variable, wherein the digital variable is stored in a volatile storage element coupled to the non-volatile storage element.

20. The method of claim 19, further comprising writing a memory word in a non-volatile storage element, a value of the memory word being equivalent to the value of the digital variable.

21. The method of claim 20, further comprising reading the memory word before an operation considered vital for the execution of the program or for the security of the non-volatile memory.

22. The method of claim 21, further comprising varying an address of the memory word in the non-volatile memory.

23. The method of claim 19, wherein the intervening comprises clearing at least one portion of the data stored in the non-volatile storage element.

24. The method of claim 19, wherein the intervening comprises halting the execution of the program.

25. The method of claim 19, further comprising detecting, using a detector, the disturbance in the execution of the program.

* * * * *